United States Patent Office 3,436,428
Patented Apr. 1, 1969

3,436,428
ALICYLIC GLYCOLS
Theodore E. Stanin, William H. Seaton, and Chapman M. Hale, Jr., Kingsport, Tenn., assignors to Eastman Kodak Company, Rochester, N.Y., a corporation of New Jersey
No Drawing. Filed Sept. 28, 1965, Ser. No. 491,028
Int. Cl. C07c 29/02, 35/18
U.S. Cl. 260—617
4 Claims

ABSTRACT OF THE DISCLOSURE 2-(hydroxymethylcyclohexenyl) ethanols and 2-(hydroxymethylcyclohexyl) ethanols and methods for their preparation. The compounds of this invention are useful when esterified and polymerized to form adhesives.

---

This invention relates to novel alicyclic glycols and their preparation. More particularly this invention relates to novel 2-(hydroxymethylcyclohexenyl)ethanols and to novel 2-(hydroxymethylcyclohexyl)ethanols.

The novel 2-(hydroxymethylcyclohexenyl)ethanols of our invention can be represented by the general formula:

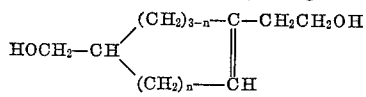

in which $n$ is an integer from 0 to 2. The novel 2-(hydroxymethylcyclohexenyl)ethanols of our invention are the compounds 2-(3-hydoxymethylcyclohexenyl)ethanol of the formula:

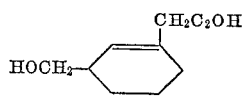

2-(4-hydroxymethylcyclohexenyl)ethanol of the formula:

and 2-(5-hydroxymethylcyclohexenyl)ethanol of the formula:

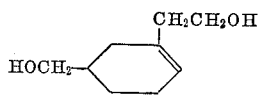

The novel 2-(hydroxymethylcyclohexyl)ethanols of our invention can be represented by the general formula:

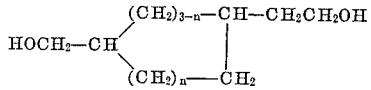

in which $n$ is an integer from 0 to 2. The novel 2-(hydroxymethylcyclohexyl)-ethanols of our invention are the compounds 2-(3-hydroxymethylcyclohexyl)-ethanol of the formula:

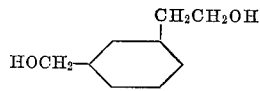

and 2-(4-hydroxymethylcyclohexyl)ethanol of the formula:

The novel alicyclic glycols of our invention are useful in preparing polyesters which are useful as adhesives. Polyesters prepared from the novel 2-(hydroxymethylcyclohexenyl)ethanols of our invention can be formed into low-melting fibers or films which can then be heat-cured to form high-melting fibers or films. In addition, the 2-(hydroxymethylcyclohexenyl)ethanols are intermediates which are used in preparing 2-(hydroxymethylcyclohexyl)ethanols.

The 2-(hydroxymethylcyclohexenyl)ethanols of our invention are prepared by reacting formaldehyde with a methylenecyclohexylmethanol according to the following general equation:

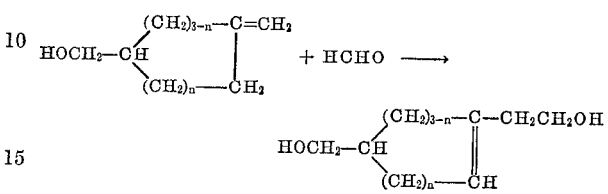

in which $n$ is an integer from 0 to 2.

The compound 2-(4-hydroxymethylcyclohexenyl)-ethanol is obtained when formaldehyde is reacted with 4-methylenecyclohexylmethanol. A mixture of the compounds 2-(3-hydoxymethylcyclohexenyl)ethanol and 2-(5-hydroxymethylcyclohexenyl)ethanol is obtained when formaldehyde is reacted with 3-methylenecyclohexylmethanol.

In accordance with the process of our invention formaldehyde is contacted with a methylenecyclohexylmethanol at elevated temperature and pressure. The reaction is typically carried out at a temperature of about 100° C. to about 250° C. and a pressure ranging from autogenous pressure up to about 500 pounds per square inch, or higher. The reaction is preferably carried out at a temperature of about 190° C. to about 210° C. and at autogenous pressure.

Reaction times of about 1 to about 48 hours are suitable though shorter or longer reaction times can be employed. In general reaction times of from about 4 to about 8 hours are satisfactory.

No catalyst is necessary in carrying out the reaction between formaldehyde and a methylenecyclohexylmethanol. The reaction can be carried out in the presence or absence of a solvent. Suitable solvents include alcohols such as methanol, ethanol, isopropanol, n-propanol, n-butanol, isobutanol, etc. The reactants combine in equimolar proportions and equimolar amounts of the reactants are therefore satisfactory. However, a molar excess of either the methylenecyclohexylmethanol or formaldehyde can be employed. In general it is sometimes preferred to use an excess of the methylenecyclohexylmethanol.

The formaldehyde employed in the process of our invention can be an aqueous or alcoholic solution of formaldehyde or can be paraformaldeyde. In general, the use of paraformaldehyde is preferred.

The novel 2-(hydroxymethylcyclohexyl)ethanols of our invention are prepared by reducing a 2-(hydroxymethylcyclohexenyl)ethanol. The reduction of 2-(3-hydroxymethylcyclohexenyl)ethanol or 2-(5-hydroxymethylcyclohexenyl)ethanol gives 2-(3-drydroxymethylcyclohexyl)ethanol and the reduction of 2-(4-hydroxymethylcyclohexenyl)ethanol gives 2-(4-dydroxymethylcyclohexyl)ethanol.

The reduction is preferably carried out by contacting the 2-(hydroxymethylcyclohexenyl)ethanol with hydrogen in the presence of a hydrogenation catlyst. Conventional hydrogenation catalysts can be employed. Examples of useful hydrogenation catalysts include Raney nickel, supported nickel, Raney cobalt, supported cobalt, supported or unsupported ruthenium, platinum, palladium, copper chromite, etc. Among the preferred catalysts is supported ruthenium, e.g., 5% ruthenium on carbon. The hydrogenation is typically carried out at elevated temperature and pressure, e.g., a temperature of about 75° C.

to about 200° C. and a hydrogen pressure of about 500 to about 5000 pounds per square inch. Especially preferred temperatures are from about 100° C. to about 125° C. and preferred pressures are from about 2000 to about 3000 pounds per square inch hydrogen pressure.

The hydrogenation can be carried out in the presence or absence of a solvent. Among the useful solvents are alcohols such as methanol ethanol, propanol, etc. In general it is preferred to conduct the hydrogenation in the absence of a solvent.

The following examples illustrate the compounds and process of our invention:

EXAMPLE 1

An autoclave was charged with 378 g. (3.0 M) of 4-methylenecyclohexylmethanol and 105 g. (3.75 M) of paraformaldehyde. The autoclave was heated to 200° C. and agitated for six hours. The reaction mixture was removed from the autoclave and distilled to provide 211 g. (1.35 M) of 2-(4-hydroxymethylcyclohexenyl)ethanol B.P. 122° C./0.5 mm., $n_D^{20}$ 1.5075. The conversion to 2-(4-hydroxymethylcyclohexenyl)ethanol was 45%.

EXAMPLE 2

An autoclave is charged with 504 g. (4.0 M) of 3-methylenecyclohexylmethanol and 56 g. (2.0 M) of paraformaldehyde. The autoclave is heated to 175° C. and agitated for eight hours. The reaction mixture is removed from the autoclave and distilled to provide 2-(3-hydroxymethylcyclohexenyl)ethanol and 2-(5-hydroxymethylcyclohexenyl)ethanol.

EXAMPLE 3

A rocking type autoclave was charged with 1250 g. (8.0 M) of 2-(4-hydroxymethylcyclohexenyl)ethanol, 65 g. of 5% ruthenium on carbon, and 500 cc. of methanol. The autoclave was sealed, placed in the rocker and connected with a supply of hydrogen. The autoclave was pressurized with hydrogen to 700 pounds per square inch (p.s.i.) and heated to 125° C. while being agitated. The autoclave was maintained at 125° C. and the hydrogen pressure was increased to 3000 p.s.i. After seven hours the absorption of hydrogen ceased. The autoclave was cooled and excess pressure was released. The reaction mixture was removed from the autoclave, filtered and distilled to yield 760 g. (4.8 M) of 2-(4-hydroxymethylcyclohexyl)ethanol, B.P. 120–122° C. at 0.3 mm. The conversion to 2-(4-hydroxymethylcyclohexyl)ethanol was 60%.

EXAMPLE 4

The procedure of Example 3 is repeated using a mixture of 2-(3-hydroxymethylcyclohexenyl)ethanol and 2-(5-hydroxymethylcyclohexenyl)ethanol in place of 2-(4-hydroxymethylcyclohexenyl)ethanol. Distillation of the reaction mixture gives 2-(3-hydroxymethylcyclohexyl)ethanol.

The following example illustrates the preparation of adhesives employing the compounds of our invention.

EXAMPLE 5

A polyester from terephthalic acid, isophthalic acid, and 2-(4-hydroxymethylcyclohexenyl)ethanol was prepared as follows. A mixture of 116.4 g. (0.6 M) of dimethyl terephthalate, 77.6 g. (0.4 M) of dimethyl isophthalate, 208 g. (1.33 M) of 2-(4-hydroxymethylcyclohexenyl)ethanol, and 0.8 ml. of a catalyst solution containing 1.9% titanium and 0.5% magnesium was stirred and heated at 190–200° C. for two hours while distilling off methanol. The pressure was then reduced to 0.1 mm. and the temperature raised to 280° C. at which point it was held for one hour. After cooling a hard tough polymer of inherent viscosity 0.67 was obtained.

A polyester from terephthalic acid, isophthalic acid and 2-(4-hydroxymethylcyclohexyl)ethanol was made by the above procedure except that an appropriate amount of 2-(4-hydroxymethylcyclohexyl)ethanol was substituted for the 2-(4-hydroxymethylcyclohexenyl)ethanol. The resulting polymer was clear and tough with an inherent viscosity of 0.65.

Each of these polymers were tested as leather-to-leather adhesives as follows. A thin coating of melted polymer was applied to a 1-in.² area of a 1 in. x 6 in. piece of leather. This layer was activated by heating with a heat lamp to about 150° C. and a second similar piece of leather was applied to the adhesive-covered area. Pressure was then applied until the sample had cooled. The resulting bond was then tested for peel-strength. Both samples gave strong bonds adequate for use as leather-to-leather adhesives.

Each of these polymers were also tested as adhesives for polyester film as follows. A strip of melted polyester about ¼-in. wide was applied to a strip of 1-mil thick polyethylene terephthalate. A second similar piece of polyester film was pressed against this adhesive-covered surface and heat-sealed with an iron heated to about 150° C. The bond thus formed was tested for strength. Both of the above polyesters formed strong tough bonds under these conditions.

EXAMPLE 6

A polyester from terephthalic acid and 2-(4-hydroxymethylcyclohexenyl)ethanol was prepared as follows.

A mixture of 97 g. (0.5 mole of dimethyl terephthalate, 101.4 g. (0.65 mole) of 2-(4-hydroxymethylcyclohexenyl)ethanol and 0.8 ml. of the catalyst solution previously described in Example 5 was stirred and heated at atmospheric pressure and 190–200° C. for 2 hours while removing methanol. The pressure was then reduced to 0.1 mm. and the temperature was raised to 285° at which point it was held for 1 hour. After cooling a hard, fiber-forming polymer, inherent viscosity 0.89, was obtained. Fibers spun from this polymer, when heated in the absence of air, melted at 65–100° C. However, if the fiber was heated slowly in air to 225° C. it did not melt.

Although the invention has been described in considerable detail with particular reference to certain preferred embodiments thereof, variations and modifications can be effected within the spirit and scope of the invention as described hereinbefore and as defined in the appended claims.

We claim:
1. A compound having the formula:

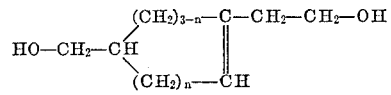

in which $n$ is an integer from 0 to 2.
2. 2-(3-hydroxymethylcyclohexenyl)ethanol.
3. 2-(4-hydroxymethylcyclohexenyl)ethanol.
4. 2-(5-hydroxymethylcyclohexenyl)ethanol.

References Cited

UNITED STATES PATENTS

| | | | |
|---|---|---|---|
| 2,418,290 | 4/1947 | Bruson et al. | 260—617 X |
| 2,601,075 | 6/1952 | Wicklatz | 260—617 X |
| 2,818,440 | 12/1957 | Rust et al. | 260—617 |
| 2,855,438 | 10/1958 | Madison et al. | 260—617 X |
| 2,873,297 | 2/1959 | Ramsden | 260—617 X |
| 2,947,780 | 8/1960 | Teegarden et al. | 260—617 XR |
| 3,143,542 | 8/1964 | Ziegler et al. | 260—617 X |
| 3,205,256 | 9/1965 | Stumpf | 260—617 X |

FOREIGN PATENTS 872,357    7/1961    Great Britain.

(Other references on following page)

OTHER REFERENCES

Arai et al. Bull. Chem. Soc. Jap. vol. 35, pp. 818–23 (1962). QDI. C65.

Ashley et al. J. Chem. Soc. 1958, p. 3307. QDI. C6.

Bachmann et al. J. Am. Chem. Soc. vol. 71, pp. 3222–3 (1949). QDI. A5.

Bost et al. J. Org. Chem. vol. 22, pp. 51–55 (1957). QD241. J6.

Haggis et al. J. Chem. Soc. 1953, pp. 399–407. QDI. C6.

Harrison et al. J. Chem. Soc. 1958, pp. 843–48. QDI. C6.

LEON ZITVER, *Primary Examiner.*

T. G. DILLOHUNTY, *Assistant Examiner.*

U.S. Cl. X.R.

156—332; 161—226; 260—75